FOLLOW-UP SYSTEMS AND APPARATUS

Filed June 5, 1957 3 Sheets-Sheet 1

INVENTOR.
Robert Adler.
BY
Olson, Mecklenburger, von Holst, Pendleton, & Neuman. Attys.

FOLLOW-UP SYSTEMS AND APPARATUS

Filed June 5, 1957 3 Sheets-Sheet 2

INVENTOR.
Robert Adler.
BY.
Olson, Mecklenburger, von Holst, Pendleton, & Neuman. Attys.

INVENTOR.
Robert Adler.
BY.
Olson, Mecklenburger, von Holst, Pendleton & Neuman. Attys.

United States Patent Office
2,965,715
Patented Dec. 20, 1960

2,965,715

FOLLOW-UP SYSTEMS AND APPARATUS

Robert Adler, Northfield, Ill., assignor, by mesne assignments, to Peter G. S. Mero, doing business as Electrowriter Company Filed June 5, 1957, Ser. No. 663,652
12 Claims. (Cl. 178—20)

Figure 1:
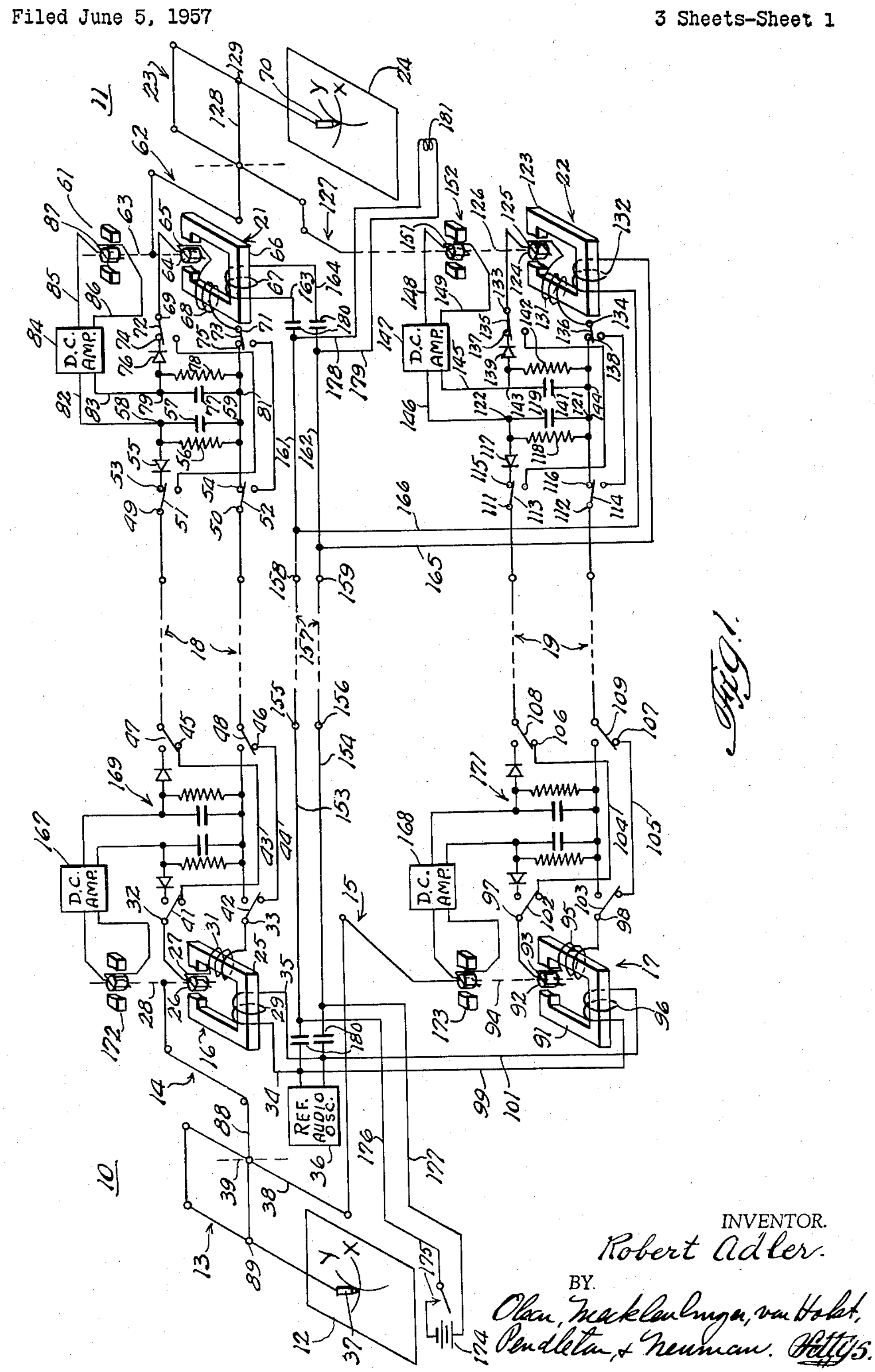

This invention relates to follow-up systems and apparatus, and more particularly to written intelligence transmitting and receiving systems and apparatus which may be termed "tele-autographic" systems and apparatus, and has as a principal object the provision of improved and simplified forms of such systems and apparatus utilizing metallic circuits for transmitting and receiving intelligence signals and for eliminating the effects of adverse or extraneous variations in the intelligence signals caused by transmission or other conditions.

It is a further object of the invention to provide improved systems and apparatus of the character indicated for use in installations wherein the metallic transmission circuits are relatively short.

It is a further object of the invention to provide improved systems and apparatus of the character indicated wherein the complexity of terminal apparatus is reduced to a minimum.

It is a further object of the invention to provide systems and apparatus of the character indicated whereby the cost thereof is substantially reduced.

In follow-up systems and apparatus it is well known to transmit the intelligence signals by means of a variable frequency wherein the frequency variations embody the intelligence. Such equipment has the advantage that frequency is unaffected by attenuation over long distances whether the transmission is by transmission lines, i.e. metallic circuits, or radio links. This is of great advantage in follow-up systems and particularly so in written intelligence transmission systems, handwriting transmission systems, for example wherein the intelligence to be transmitted is resolved into two components and a separate signal transmitted for each component. Such systems and apparatus, however, require substantially complex terminal apparatus including, for example, band pass filters, limiters, discriminators, numerous amplifiers, and the like.

While variable frequency apparatus is usable in situations where the distances between transmitting and receiving stations are short, it is uneconomical to do so in view of the complexity and consequent high cost of the terminal apparatus. In such cases utilizing metallic circuits for transmitting intelligence signals and variations in amplitude as characteristic of the intelligence achieves substantal economies, and according to the invention extraneous signal variation effects are eliminated by transmitting, in effect, a ratio between a signal amplitude and a reference amplitude, which ratio is characteristic of the intelligence.

The invention comprises the improvement over the prior art involved in the concept that for short distances of intelligence transmission, individual metallic circuits for each intelligence channel utilizing amplitude for the intelligence signals and a suitable system for compensating for signal attenuation due to such metallic circuits or other extraneous signal variations, including where appropriate a separate metallic circuit, may be economically used as compared with variable frequency intelligence transmitting systems.

The invention also comprises a novel compensating system which is that of transmitting in effect a ratio of signal and reference amplitudes as characteristic of the intelligence. Briefly, the ratio of signal and reference amplitudes free of undesired variations is obtained at the generating and at the receiving end by providing a common reference signal generator which energizes the signal generators at both the generating and receiving ends.

Figure 2:
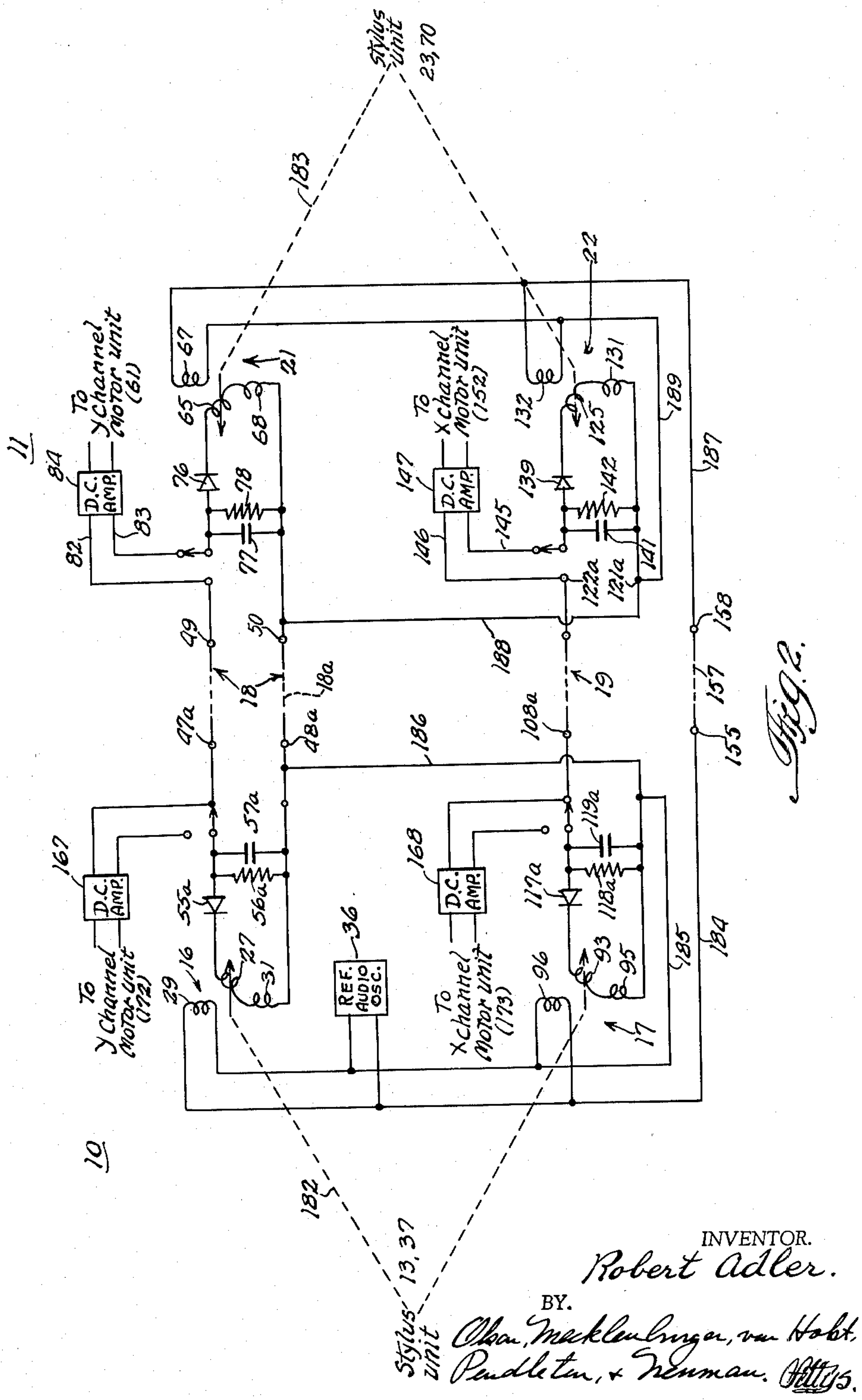
Figure 3:
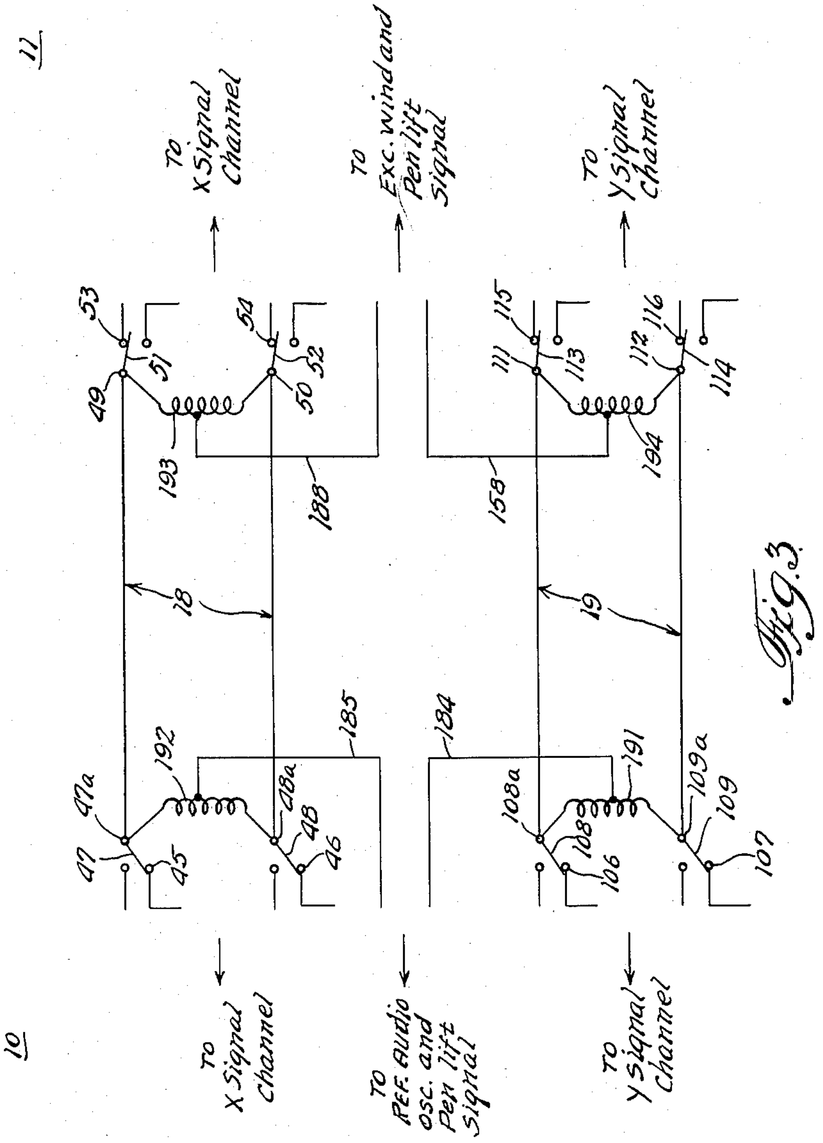

For a more complete understanding of the invention, reference should be had to the accompanying drawings, in which Figure 1 is a diagrammatic representation of apparatus and an electrical circuit embodying one form of the invention;

Fig. 2 is a fragmentary diagrammatic representation similar to Fig. 1 of another form of the invention, and Fig. 3 is a fragmentary diagrammatic representation of a still further form of the invention.

Referring to Fig. 1, there is shown, according to the invention, a handwriting transmitting and receiving system comprising transmittng and receiving stations 10 and 11, but, acocrding to the principal description hereof, station 10 will be considered as a transmitting station and station 11 will be considered as a receiving station. While the description will proceed as though handwriting were the intelligence to be transmitted and received, it will be understood that this is exemplary only and that the invention applies to any form of written intelligence.

Basically, at the transmitting station 10, the written intelligence as it proceeds on a writing surface 12 is resolved into two coordinate components referred to as "X" and "Y" components by a parallelogram linkage mechanism 13. The "Y" and "X" handwriting components are transmitted by means of the linkages 14 and 15, respectively, to the signal generating units 16 and 17. From the Y-coordinate signal generator 16 a signal is transmitted over the transmission line 18, and from the X-coordinate signal generator 17 a signal is transmitted over the transmission line 19 to the receiver 11. At the receiver the incoming signals are compared continuously with local signals generated respectively by the Y-coordinate signal generator 21 and an X-coordinate signal generator 22, thereby creating error signals which are utilized to drive a parallelogram linkage 23 which reproduces the received intelligence upon the writing surface 24; that is, the linkage mechanism 23 combines Y- and X-coordinate motions according to the received signals into the single motion of the written intelligence.

A reference signal supplied from a reference audio oscillator 36 is used to excite signal generators 16 and 17 and is transmitted over transmission line 157 in order that a ratio of intelligence and reference signals available at the transmitting station is also available at the receiving station. The ratio of intelligence signal amplitude to reference signal amplitude is also characteristic of the position of the transmitting stylus 37 as will become clear.

The parallelogram linkage mechanisms 13 and 23 may be of the form described and claimed in Patent No. 2,583,535, Translating Apparatus and Follow-Up System, of the same inventor as the instant application.

The Y-coordinate generator signal 16 is a rotary transformer comprising a core 25 including a circular gap within which a rotor 26 is mounted and upon which rotor a winding 27 is disposed. The rotor 26 is pivotally mounted by an axis or shaft 28 to which the linkage 14 is connected for driving said rotor. An exciting winding 29 and a fixed winding 31 are also disposed on core 25, the rotary winding 27 and the fixed winding 31 being connected in series, as shown, for supplying at terminals 32 and 33 the signal output of generator 16 corresponding to the X-coordinate position. The exciting winding 29 is connected by means of conductors 34 and 35 to the reference audio oscillator 36 for excitation of the rotary transformer 16 at a suitable frequency which, for example, in one practical form of device was 3,000 cycles per second. The signal supplied by reference audio oscillator 36 may be of constant amplitude, and when such, for any single position of the rotor 26, windings 27 and 31 will produce a signal of the same amplitude, this amplitude being, therefore, characteristic of that position of the rotor. Since, in certain positions of winding 27, there will be no voltage induced therein, the winding 31 is provided so that for all positions of the winding 27 there will be a voltage at terminals 32 and 33 greater than zero, thereby avoiding ambiguities.

If the amplitude of the reference signal to winding 29 should increase or decrease, the voltage induced into windings 27 and 31 will increase or decrease by the same ratio. The ratio of the intelligence signal at terminals 32 and 33 to the reference signal is, therefore, always the same for a particular position of winding 27, and thus of the Y-coordinate of stylus 37 irrespective of the amplitude of the reference signal.

As the stylus 37 is moved along the Y-axis or coordinate direction alone, which may be visualized as being achieved by the arm 38 remaining stationary, the common pivot for the linkage being the shaft 39 shown diagrammatically, for every position of the stylus 37 there is a corresponding position of the rotor winding 27. Consequently, for every such position there is a signal of a predetermined amplitude at terminals 32 and 33 in the case of constant amplitude of reference signal to winding 29, and in any event, a ratio of predetermined amplitude between the intelligence signal amplitude and the reference signal amplitude.

The signal generating device or rotary transformer 16 may be of the form shown and function in the manner described in Patents Nos. 2,649,503 and 2,707,232, issued, respectively, on August 18, 1953 and April 26, 1955, by the same inventor as the subject application.

For transmitting the intelligence signal from station 10 to station 11, the switches 41 and 42 are in the downward position as shown, connected, respectively, to conductors 43 and 44 and thus to terminals 45 and 46 from which switches 47 and 48, respectively, connect the transmitting circuit to the transmission line conductors 18. The signal is transmitted over transmission line 18 and is received at terminals 49 and 50 forming part of the receiving mechanism 11. The switches 51 and 52 are shown connected to terminals 53 and 54, respectively, and the signal as received is rectified by rectifier 55, and a D.C. voltage is thereby provided across resistor 56 and capacitor 57 at terminals 58 and 59. The amplitude of the D.C. signal appearing at terminals 58 and 59 is, therefore, characteristic of the position of the stylus 37 along the Y-coordinate direction or axis for a particular amplitude of reference signal.

The incoming intelligence signal at terminals 58 and 59 is continuously compared with the signal generated by the Y-coordinate signal generator 21, as will now be described.

The linkage mechanism 23 is driven along the Y-coordinate direction by a motor member 61 which may be of the D'Arsonval movement type through a linkage mechanism 62 which has one member attached to the shaft 63, shown schematically, so as to pivot therewith, the linkage mechanism 62 consisting of various linked members as shown, or the like. The shaft 63 also has mounted thereon for movement therewith a rotor 64 on which is mounted a winding 65 as part of the signal generator 21 which comprises in addition a core member 66, an exciting winding 67 and a fixed winding 68. The windings 65 and 68 are connected in series and thus for any particular amplitude of excitation applied to winding 67 a signal is obtained at terminals 69 and 71 which is characteristic of the position of rotor winding 65. As will also become clear, the position of rotor winding 65 is characteristic of the ratio between the signal amplitude of series connected windings 65 and 68 and the signal amplitude of winding 67. Since the position of rotor winding 65 is determined by the position of stylus 70 of the linkage mechanism 23, the signal amplitude at terminals 69 and 71 is characteristic of the position of stylus member 70 for a certain amplitude of excitation in winding 67. As the position of stylus 70 varies along the Y-coordinate axis, the position of winding 65 of the rotary transformer 21 varies and thus a varying signal is generated at terminals 69 and 71 in accordance with the position of the stylus.

The signal at terminals 69 and 71 is transmitted through switches 72 and 73 to terminals 74 and 75, respectively, and is rectified by rectifier 76. A D.C. voltage is therefore obtained across capacitor 77 and resistor 78 and thus across terminals 79 and 81, the D.C. voltage across capacitor 77 being therefore characteristic of the position of stylus 70 for a constant amplitude reference signal. The D.C. voltage at terminals 79 and 81 is compared with the incoming D.C. voltage across terminals 58 and 59 and the difference or error voltage is applied through conductors 82 and 83 to D.C. amplifier 84 from which a D.C. voltage is supplied through conductors 85 and 86 to the moving element 87 of the motor 61. The motor, accordingly, drives the linkage mechanism 23 along the Y-axis by means of the shaft 63 and the linkage elements 62 and, at the same time, drives the rotor winding 65 in an appropriate direction until the voltage generated, when rectified and received at terminals 79 and 81, equals the incoming voltage at terminals 58 and 59. Whenever the input voltage to the D.C. amplifier 84 is zero, that is, when the receiving stylus 70 occupies the same position as the transmitting stylus 37, then no further output of voltage is applied to moving element 87, and the receiving stylus remains at rest. Correspondingly, whenever the incoming signal changes in response to movements of the transmitting stylus in either direction, an appropriate voltage change occurs across terminals 58 and 59, thereby creating an error signal and causing the receiving stylus 70 to move into correspondence with the transmitting stylus at which the received D.C. voltage and locally generated D.C. voltage are equal. This is upon the assumption that no extraneous variations in the intelligence signal occurred.

The X-coordinate motion of the written intelligence may be visualized as being obtained when the link member 88 of the linkage mechanism 13 is stationary and the stylus 37 is moved, pivoting taking place about the pivot 89. Such movements of the stylus 37 will be transmitted by the parallelogram linkage mechanism 13 by means of arm 38 and connected linkages 15 to the signal generator 17, which generates a signal whose amplitude corresponds at each instant to the position of stylus member 37 along the X-coordinate direction for a constant excitation in the same manner as described for the signal generator 16 for the Y-coordinate direction. In any event, the position of the linkage corresponds to the ratio between the generated signal and the excitation signal.

The signal generator or rotary transformer 17 comprises a core member 91 including a gap within which a rotor 92, including a winding 93 thereon, is mounted for rotation about axis 94. Also disposed on core 91 is a fixed winding 95 and an exciting winding 96. The windings 93 and 95 are connected in series to provide an X-coordinate signal, always greater than zero, supplied to terminals 97 and 98 for transmission to the receiving station 11. The exciting winding 96 is connected by means of conductors 99 and 101 to the reference audio oscillator 36 so that the rotary transformer 17 is excited with the same amplitude and frequency as rotary transformer 16 which, as indicated, has been 3,000 cycles per second in some cases.

In this case also, if the amplitude of the reference signal to winding 96 should increase or decrease, the voltage induced into windings 93 and 95 will increase or decrease by the same ratio. The ratio of the intelligence signals at terminals 97 and 98 to the reference signal is, therefore, always the same for a particular position of winding 27 and thus of the X-coordinate of stylus 37, irrespective of the amplitude of the reference signal.

The linkage mechanism 15 transmitting the X-coordinate motions of stylus 37 is connected to axis or shaft 94 for this purpose. The X-coordinate signal appearing at terminals 97 and 98 is conducted through switches 102 and 103, conductors 104 and 105, terminals 106 and 107 and switches 108 and 109, all respectively, to the conductors of transmission line 19.

The X-coordinate signal is then transmitted over transmission line 19 to terminals 111 and 112 at the receiving station 11, is conducted through switches 113 and 114 to terminals 115 and 116 and is rectified in rectifier 117, thereby providing a D.C. voltage across resistor 118 and capacitor 119 at terminals 121 and 122. This D.C. voltage has an amplitude which is characteristic of the position along the X-coordinate direction of stylus 37 as indicated.

At the receiving station 11, in a manner similar to that described in connection with the signal generator 21 for the Y-coordinate direction, a local signal corresponding to the positions along the X-coordinate direction is generated by signal generator or rotary transformer 22. The rotary transformer 22 comprises a core 123, a rotor 124 upon which a winding 125 is disposed for rotation with the rotor, the rotor being mounted on a shaft or axis 126 which is connected by means of a linkage 127 to the parallelogram linkage 23 and thus to stylus 70. Through the linkage mechanisms indicated, motions of stylus member 70 along the X-coordinate direction take place, which motions may be visualized as being obtained when the arm 128 remains stationary, pivoting taking place about pivot 129.

Rotary transformer 122 also comprises a fixed winding 131 and an exciting winding 132. The rotor winding 125 and the fixed winding 131 are connected in series, thus supplying a signal whose amplitude corresponds to the X-coordinate position to terminals 133 and 134. This signal has a frequency corresponding to the excitation frequency and is conducted through switches 135 and 136 to terminals 137 and 138 and to a rectifier 139, whereby a D.C. voltage is obtained across capacitor 141 and resistor 142 at terminals 143 and 144. Such D.C. voltage has an amplitude which corresponds to the instantaneous position of the stylus 70 along the X-coordinate direction and is compared instantaneously with the incoming D.C. signal at terminals 121 and 122, giving rise to a difference or error signal which is applied through conductors 145 and 146 to D.C. amplifier 147. The D.C. amplifier 147 amplifies the error signal in an appropriate amount which is then transmitted through conductors 148 and 149 to the moving element 151 of the motor unit 152. The motor unit 151 is connected to the axis or shaft 126 and thus drives the stylus 70 along the X-coordinate direction through the links 127 and the linkage mechanism 23 and also drives the rotor 124 of the rotary transformer 22. The motor unit continues to drive the stylus 70 and the rotor 124 until the signal amplitude generated by the rotary transformer 22 and appearing in rectified form at terminals 123 and 124 is equal to the incoming signals at terminals 121 and 122, whereby the voltage to the D.C. amplifier 147 is zero and the motor 152 stops. Thus the motor unit 152 stops when the stylus 70 along the X-coordinate direction occupies the same position as the stylus 37 along the Y-coordinate direction on the assumption of an appropriate reference signal being applied to winding 132.

Since the signal generator is a ratio device, the final position of coil 125 will correspond to the ratio between the signal at terminals 133 and 134 and the signal in exciting winding 132.

The written intelligence having been resolved into X and Y components at the transmitting station 10 and appropriate corresponding signals having been transmitted to the receiving station 11, the X and Y components of the written intelligence are recombined at station 11 to reproduce the original written intelligence.

In order that the number of sources of excitation for the exciting windings 29, 67, 96 and 132 of the rotary transformers 16, 21, 17 and 22, respectively, may be reduced to a minimum, to provide a common reference signal for these exciting windings, and to enable the elimination of errors due to transmission conditions or the like, the signal reference audio oscillator 36 is provided and is utilized to excite all of the exciting windings. Accordingly, the single frequency reference signal from oscillator 36 is transmitted by means of conductors 153 and 154 to terminals 155 and 156, respectively, and thus over the conductors of transmission line 157 to terminals 158 and 159 at the receiving station 11. From terminals 158 and 159, the reference signal is transmitted by means of conductors 161 and 162 and conductors 163 and 164 to exciting winding 67, and by means of conductors 165 and 166 to exciting winding 132.

The signal from oscillator 36 may be and preferably is of constant amplitude but this is not necessary, inasmuch as the ratio between amplitudes of the intelligence signals and the reference signals determines the final position of the receiving stylus 70.

The intelligence signals transmitted over transmission lines 18 and 19 may vary in magnitude due to changes in the amplitude of the signal from reference amplifier 36 and are subject to attenuation and perhaps other extraneous variations, and thus errors may exist in the intelligence signal components as received at terminals 58 and 59 and 121 and 122. Some compensation for such errors must be made or th error signal developed as a result of the locally generated signal at the receiver will cause the receiving stylus 70 to occupy incorrect positions.

Transmitting the reference signal from the transmitting station 10 to the receiving station 11 over transmission line 157 which is subject to the same conditions of attenuation or adverse conditions as the intelligence signal components provides the basis for the necessary compensation. Thus, for example, if the intelligence signal decreases in magnitude by some percentage due to the transmission conditions, the reference signal transmitted over the transmission line 157 will also decrease by the same percentage. Accordingly, the amount of excitation received by exciting windings 67 and 132 is decreased by that same percentage, and the signals generated by the series combinations of windings 65 and 68 in rotary transformer 21 and windings 125 and 131 in rotary transformer 22 are likewise decreased by the same percentage. Thus the incoming intelligence signal which is less in amplitude by a certain percentage is compared with a locally generated signal which is also less by the same percentage. The difference or error signal is also less by that same percentage but it becomes zero in the case of each coordinate signal component when the receiving stylus 70 occupies the correct position. At such correct position, the ratio of signal to reference amplitude at the transmitter is the same as the ratio of signal to reference amplitude at the receiver, which is to say that the transmitting element and the following element are in the same position. This general manner of compensating for variations during transmitting conditions has been disclosed and claimed in said Adler Patent No. 2,649,503, hereinbefore referred to, but the invention of the subject application utilizes this effect in the provision of an improved apparatus and system according to the subject invention.

If the amplitude of the reference signal should change at the oscillator 36, no errors would be experienced at the receiver since the intelligence signals at the transmitter would be altered by the same percentage as would then the local signals generated at the receiver with which they are compared.

In the invention as disclosed, a single reference oscillator only is required, band-pass filters, limiters, discriminators, and numerous amplifiers have been eliminated to arrive at a greatly simplified circuit utilizing separate circuits for the signal components and the reference signal.

In the event that it is considered advisable to transmit from station 11 and to receive at station 10, it is only necessary to change the switches 72 and 73, 51 and 52, 135 and 136, and 113 and 114 at station 11 to the alternate position shown and to change the positions of switches 47 and 48, 41 and 42, 108 and 109, and 102 and 103 at station 10 to the alternate positions shown. This removes at station 11 the D.C. amplifiers 84 and 147 and the networks supplying signals thereto, and thus motor units 61 and 22 remain unenergized. At station 10, it connects D.C. amplifiers 167 and 168 and error signal networks 169 and 171 into the circuit for driving, respectively, motor units 172 and 173 to drive the linkage mechanism 13. Accordingly, written intelligence at station 10 is reproduced and the rotors 26 and 92 of rotary transformers 16 and 17, respectively, are driven for producing the locally generated signals, as will be clear from the preceding description.

In the transmission of written intelligence, it is convenient to have a signal sent from the transmitting station to the receiving station for applying the stylus at the receiving station to the writing surface when transmission is to take place. Such a pen-lift signal may be transmitted over the circuits shown schematically by a D.C. signal. Thus at the transmitting station 10, a battery 174 may be provided in series with a switch 175 which is closed when the stylus 37 is applied to the writing surface. A complete circuit is then provided through conductors 176, 177, conductors 153 and 154, transmission line conductors 157, conductors 161 and 162 and conductors 178 and 179 to a coil 181 which actuates the stylus 70 to the writing surface 24. When transmitting stylus 37 is removed from the writing surface, the switch 175 will open, thereby interrupting the described energizing circuit and permitting stylus 70 to lift from the writing surface 24.

Capacitors 180 are shown for preventing the D.C. pen-lift signal from interfering with the A.C. reference signal.

Since the amplitude of intelligence signal attenuates as it is transmitted to a receiver, it is desirable that the reference signal be sent from the transmitter to the receiver in order to be subject to the same transmitting conditions. In situations wherein the transmission lines are short, which is one field where the invention finds particular usefulness, it may be that variations in the attenuation can be ignored, and in this case the reference audio oscillator 36, that is the reference signal generator, may be disposed anywhere in the system, perhaps equally spaced from all transmitters and receivers so long as the attenuation taking place between the reference signal generator and the transmitters and receivers is equalized.

In Fig. 2 there is shown a modified form of the invention wherein the number of transmission line conductors is reduced while still achieving the same conditions of transmission of intelligence and reference signals in the manner described in connection with Fig. 1.

In Fig. 2 the diagram is simplified, but the reference characters used designate elements corresponding to similarly designated elements in Fig. 1. Thus, for example, the stylus units 13, 37 and 23, 70 in Fig. 2 correspond to the more detailed showing of these components in Fig. 1. Likewise, the signal generating units 16, 21, 17 and 22 diagrammatically shown in Fig. 2 as comprising three windings with one of them variable correspond to the respectively numbered components in Fig. 1.

More particularly, referring to signal generator 16 in Fig. 2, it will be seen that windings 27 and 31 are connected in series, the winding 27 being shown as variable, thereby corresponding to the varying voltages generated by the winding 27 as it is rotated by rotor 26 in Fig. 1. The winding 29 of Fig. 2 is shown as exciting the windings 27 and 31 as described in connection with Fig. 1, the variability of voltage in winding 27 of Fig. 2 being brought about by the designated stylus unit brought about by the broken line 182 which corresponds in effect to the linkages between the stylus 37 and the rotor 26 of Fig. 1. Similarly, the windings 65 and 68 on Fig. 2 are shown connected in series, the winding 65 being of variable voltage effected by controlling its position from the stylus unit 23, 70 brought about by the broken-line connection 183 which corresponds to the mechanical linkage as shown in this connection in Fig. 1. Similarly illustrated, as is believed to be clear, are the signal generating units 17 and 22 as shown in Fig. 2.

Accordingly in the illustration of Fig. 2, when the stylus unit 37 is moved, signals of varying amplitude are generated corresponding to the Y- and X-coordinates by signal generators 16 and 17, respectively. These amplitude signals are transmitted to the receiving station 11 where, through the apparatus illustrated, a locally generated signal is compared with the incoming signal and an error signal is obtained, which effects driving of the stylus unit until the error signal is reduced to zero. Such driving takes place through the X-channel motor unit and the Y-channel motor unit as shown by the legends in Fig. 2.

The essential difference between the disclosure of Fig. 2 and that of Fig. 1 is in the fact that the disclosure of Fig. 2 utilizes four transmission line conductors for transmitting the two signal components and a reference signal. A further distinction lies in the fact that the Y- and X-component signals are rectified at the transmitter and are transmitted as D.C. signals rather than as A.C. signals, which is advantageous in that there is no significant leakage with D.C. signals. Thus the reference audio oscillator 36 of Fig. 2 supplies to the exciting windings 29 and 96 of signal generating units 16 and 17, respectively, a constant amplitude signal of perhaps 3,000 cycles in frequency.

The output signals of windings 27 and 31 are rectified by rectifier 55*a* and provide a D.C. voltage across capacitor 57*a* and resistor 56*a*, which D.C. voltages are characteristic of the stylus position along the Y-coordinate direction. This D.C. signal is transmitted to the terminals 47*a* and 48*a* and is thereby transmitted over the transmission line 18 to terminals 49 and 50 where it is compared with a locally generated D.C. signal obtained from the signal generating unit 21 and the rectifier 76 to provide an error signal. The error signal is transmitted to D.C. amplifier 84 which functions to effect driving of the stylus unit along the Y-coordinate direction as described. Similarly, the A.C. signal amplitude output of windings 93 and 95 of signal generating unit 17 is rectified in rectifier 117*a* and provides a D.C. voltage across capacitor 119*a* and resistor 118*a*, the amplitudes of which D.C. voltage are characteristic of the stylus position along the X-coordinate direction. The D.C. voltage so obtained is transmitted to the receiving station from terminals 108*a* and 48*a* over a transmission line consisting of one conductor 19 and conductor 18*a* of the transmission line 18.

Two D.C. intelligence signals are transmitted over three wires which is possible inasmuch as one of the wires may be used in common without altering the character of the signals transmitted. At the receiving station 11 the incoming signal on transmission line conductors 19 and 18*a* is applied to terminals 121*a* and 122*a* and is thereby compared directly with the D.C. voltage across capacitor 141 and resistor 142 which is a locally generated signal corresponding to the stylus position along the X-coordinate direction. The error signal so generated is applied to D.C. amplifier 47 which effects driving of the X-channel motor unit as shown by the legend on Fig. 2 until the error signal becomes zero.

The reference audio oscillator 36 connected to exciting windings 29 and 96 is shown as being connected by conductor 184 to transmission line 157 and by conductors 185 and 186 to the transmission line conductor 18*a*. The reference signals so received at terminals 158 and 50 at the receiving station 11 are connected by conductor 187 and conductors 188 and 189 to the exciting windings 132 and 67 of the local signal generating units 22 and 21.

In this instance also conductor 157 of the transmission line is utilized as one conductor for transmitting the reference signal and the common conductor 18 is utilized as the other conductor of the transmission line which may be done without altering the character of the signals being transmitted.

In Fig. 3 there is shown a further modified form of the invention corresponding in over-all operation to the disclosures of Figs. 1 and 2. In Fig. 3 the transmission lines 18 and 19 are shown for transmitting, respectively, the Y-component and X-component intelligence signals, which signals are generated at the transmitting station 10 and treated at the receiving station 11 in the manner described in connection with Figs. 1 and 2. The disclosure of Fig. 3, distinguishing this figure from the preceding figures, lies principally in the fact that the reference signal from the reference audio oscillator is sent over a phantom circuit combining the two transmission lines 18 and 19, four wires being utilized in two transmission lines which is the same number of conductors utilized in Fig. 2.

The reference signal is supplied to transmission lines 18 and 19 by conductors 184 and 185 to the mid-points of impedances 191 and 192 connected, respectively, across terminals 108*a* and 109*a* of transmission line 19 and terminals 47*a* and 48*a* of transmission line 18. At the receiving station 11, impedances 193 and 194 are connected across the terminals, respectively, 49 and 50 of transmission line 18, and terminals 111 and 114 of transmission line 19. From the mid-points of impedances 193 and 194, respectively, conductors 188 and 158 are taken and are thereafter connected to the exciting windings of the local signal generators and pen-lift apparatus, if desired. In the circuit described, the intelligence signals corresponding to the Y- and X-components may be either D.C. or A.C. signals in accordance with the disclosure of Figs. 1 and 2, and the reference signal is an A.C. signal of the same frequency as previously described. On relatively long circuits wherein the intelligence signals are D.C., it may be necessary to equalize the attenuation as between the D.C. intelligence signal and the A.C. reference signal in accordance with well-understood means.

While the invention has been described particularly in connection with written intelligence requiring two channels of information, it also has application to follow-up systems and apparatus wherein only a single channel of information is transmitted.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A follow-up system comprising a transmitter including a directing element whose position is resolved by two component members into two component positions and for each of which component positions a separate intelligence signal is transmitted to a receiver, and a pair of A.C. generators one each of which is connected to a respective one of said component members for generating a pair of A.C. intelligence signals of the same fixed frequency whose amplitudes correspond respectively to the component positions of said directing element; a receiver including a following element for following said directing element and whose position is the resultant of the positions of two component followers whose positions correspond respectively to the component member positions of said directing element, a pair of A.C. generators one each of which is connected to a respective one of said component followers for generating a pair of A.C. follower signals of said fixed frequency whose amplitudes correspond respectively to the component positions of said following element, and a pair of motor means one each of which is connected to a respective one of said component followers for driving thereof; a first transmission line for transmitting said A.C. intelligence signal from one generator at said transmitter to said receiver; a second transmission line for transmitting said A.C. intelligence signal from the second generator at said transmitter to said receiver; separate means at said receiver for continuously comparing each of said intelligence signals separately as received from said transmission lines with the corresponding follower signals and providing a pair of difference signals; first means utilizing one of said difference signals for energizing one of said motor means to drive one of said component followers in correspondence with the respective directing element component member; second means utilizing the other of said difference signals for energizing the other of said motor means to drive the other of said component followers in correspondence with the respective other directing element component member; and A.C. reference signal means at said transmitter providing a constant amplitude signal of said fixed frequency for exciting said director component member generators directly, thereby determining an intelligence signal reference amplitude at said transmitter; means including said first and second transmission lines for transmitting said reference signal from said reference signal means to said receiver; and means for exciting said follower component generators with such reference signal after such transmission to said receiver, thereby determining an intelligence signal conditioned reference amplitude for said follower component generated signals.

2. A follow-up system comprising a transmitter including a directing element whose position is resolved by two component members into two component positions and for each of which component positions a separate intelligence signal is transmitted to a receiver, and a pair of A.C. generators one each of which is connected to a respective one of said component members for generating a pair of A.C. intelligence signals of the same fixed frequency whose amplitudes correspond respectively to the component positions of said directing element; a receiver including a following element for following said directing element and whose position is the resultant of the positions of two component followers whose positions correspond respectively to the component member positions of said directing elements, a pair of A.C. generators one each of which is connected to a respective one of said component followers for generating a pair of A.C. follower signals of said fixed frequency whose amplitudes correspond respectively to the component positions of said following element, and a pair of motor means one each of which is connected to a respective one of said component followers for driving thereof; a first two-wire transmission line for transmitting said A.C. intelligence signal from one generator at said transmitter to said receiver including first impedances across said two wires, one at the transmitter and the other at the receiver; a second two-wire transmission line for transmitting said A.C. intelligence signal from the second generator at said transmitter to said receiver including second impedances across said two wires, one at the transmitter and one at the receiver; separate means at said receiver for continuously comparing each of said intelligence signals separately as received from said transmission lines with the corresponding follower signals and providing a pair of difference signals; first means utilizing one of said difference signals for energizing one of said motor means to drive one of said component followers in correspondence with the respective directing element component member; second means utilizing the other of said difference signals for energizing the other of said motor means to drive the other of said component followers in correspondence with the respective other directing element component member; and A.C. reference signal means at said transmitter providing a constant amplitude signal of said fixed frequency for exciting said director component member generators directly, thereby determining an intelligence signal reference amplitude at said transmitter, said A.C. reference signal means being connected to the mid-points of the first and second impedances at said transmitter for transmitting said reference signal from said reference signal means to said receiver; and means connected to the mid-points of the first and second impedances at said receiver for exciting said follower component generators with such reference signal after such transmission to said receiver, thereby determining an intelligence signal conditioned reference amplitude for said follower component generated signals.

3. A written intelligence follow-up system comprising a transmitter including a writing element whose position is resolved by two component members into two component positions and for each of which component positions a separate intelligence signal is transmitted to a receiver, and a pair of A.C. generators one each of which is connected to a respective one of said component members for generating a pair of A.C. intelligence signals of the same fixed frequency whose amplitudes correspond respectively to the component positions of said writing element; a receiver including a transcribing element for following said writing element and whose position is the resultant of the positions of two component followers whose positions correspond respectively to the component member positions of said directing element, a pair of A.C. generators one each of which is connected to a respective one of said component followers for generating a pair of A.C. follower signals of said fixed frequency whose amplitudes correspond respectively to the component positions of said transcribing element, and a pair of motor means one each of which is connected to a respective one of said component followers for driving thereof; a first transmission line for transmitting said A.C. intelligence signal from one generator at said transmitter to said receiver; a second transmission line for transmitting said A.C. intelligence signal from the second generator at said transmitter to said receiver; separate means at said receiver for continuously comparing each of said intelligence signals separately as received from said transmission lines with the corresponding transcriber component follower signals and providing a pair of difference signals; first means utilizing one of said difference signals for energizing one of said motor means to drive one of said transcriber component followers in correspondence with the respective writing component member; second means utilizing the other of said difference signals for energizing the other of said motor means to drive the other of said transcriber component followers in correspondence with the respective other writing component member; and A.C. reference signal means at said transmitter providing a constant amplitude signal of said fixed frequency for exciting said writing component member generators directly, thereby determining an intelligence signal reference amplitude at said transmitter; a third transmission line subject to transmitting conditions similar to said first and second transmission lines for transmitting said reference signal from said reference signal means to said receiver; means for exciting said transcriber component generators with such reference signal after such transmission to said receiver, thereby determining an intelligence signal conditioned reference amplitude for said transcriber component generated signals; means at said transmitter for generating a D.C. signal upon application of said writing element to a writing surface, said D.C. signal being transmitted to said receiver over said third transmission line; and means at said receiver utilizing said D.C. signal for applying said transcribing element to a transcribing surface.

4. A follow-up system comprising a transmitter including a directing element whose position is resolved by two component members into two component positions and for each of which component positions a separate intelligence signal is transmitted to a receiver, a pair of A.C. generators one each of which is connected to a respective one of said component members for generating a pair of A.C. intelligence signals of the same fixed frequency whose amplitudes correspond respectively to the component positions of said directing element; a receiver including a following element for following said directing element and whose position is the resultant of the positions of two component followers whose positions correspond respectively to the component member positions of said directing element, a pair of A.C. generators one each of which is connected to one each of component followers for generating a pair of A.C. follower signals of said fixed frequency whose amplitudes correspond respectively to the component positions of said following element, individual means for rectifying said component follower signals, and a pair of motor means one each of which is connected to one of said component followers for driving thereof; a first transmission line for transmitting said A.C. intelligence signal from one generator at said transmitter to said receiver; a second transmission line for transmitting said A.C. intelligence signal from the second generator at said transmitter to said receiver; individual means at said receiver for rectifying said component intelligence signals as received from said transmission lines; individual means at said receiver for continuously comparing each of said rectified component intelligence signals with the corresponding rectified component follower signals and providing a pair of difference signals; first means utilizing one of said difference signals for energizing one of said motor means to drive one of said component followers in correspondence with the respective directing element component member; second means utilizing the other of said difference signals for energizing the other of said motor means to drive the other of said component followers in correspondence with the respective other directing element component member; and A.C. reference signal means at said transmitter providing a constant amplitude signal of said fixed frequency for exciting said direct element component member generators directly, thereby determining an intelligence signal reference amplitude at said transmitter; a third transmission line subject to transmitting conditions similar to said first and second transmission lines for transmitting said A.C. reference signal from said reference signal means to said receiver; and means for exciting said follower component generators with such reference signal after such transmission to said receiver, thereby determining an intelligence signal conditioned reference amplitude for said follower component generated signal.

5. A follow-up system comprising a transmitter including a directing element whose position is resolved by two component members into two component positions and for each of which component positions a separate intelligence signal is transmitted to a receiver, a pair of A.C. generators one each of which is connected to a respective one of said component members for generating a pair of A.C. intelligence signals of the same fixed frequency whose amplitudes correspond respectively to the component positions of said directing element and individual means for rectifying said component intelligence signals; a receiver including a following element for following said directing element and whose position is the resultant of the positions of two component followers whose positions correspond respectively to the component member positions of said directing element, a pair of A.C. generators one each of which is connected to one each of component followers for generating a pair of A.C. follower signals of said fixed frequency whose amplitude correspond respectively to the component positions of said following element, individual means for rectifying said component follower signals, and a pair of motor means one each of which is connected to one of said component followers for driving thereof; a first transmission line for transmitting said rectified intelligence signal from one generator at said transmitter to said receiver; a second transmission line for transmitting said rectified intelligence signal from the second generator at said transmitter to said receiver; individual means at said receiver for continuously comparing each of said rectified component intelligence signals are received from said first and second transmission lines with the corresponding rectified component follower signals and providing a pair of difference signals; first means utilizing one of said difference signals for energizing one of said motor means to drive one of said component followers in correspondence with the respective directing element component member; second means utilizing the other of said difference signals for energizing the other of said motor means to drive the other of said component followers in correspondence with the respective other directing element component member; and A.C. reference signal means at said transmitter providing a constant amplitude signal of said fixed frequency for exciting said directing element component member generators directly, thereby determining an intelligence signal reference amplitude at said transmitter; a third transmission line subject to transmitting conditions similar to said first and second transmission lines for transmitting said reference signal from said reference signal means to said receiver; and means for exciting said follower component generators with such reference signal after such transmission to said receiver, thereby determining an intelligence signal conditioned reference amplitude for said follower component generated signals.

6. A follow-up system comprising a transmitter including a directing element whose position is resolved by two component members into two component positions and for each of which component positions a separate intelligence signal is transmitted to a receiver, a pair of A.C. generators one each of which is connected to a respective one of said component members for generating a pair of A.C. intelligence signals of the same fixed frequency whose amplitudes correspond respectively to the component positions of said directing element; a receiver including a following element for following said directing element and whose position is the resultant of the positions of two component followers whose positions correspond respectively to the component member positions of said directing element, a pair of A.C. generators one each of which is connected to one each of component followers for generating a pair of A.C. follower signals of said fixed frequency whose amplitudes correspond respectively to the component positions of said following element, individual means for rectifying said component follower signals, and a pair of motor means one each of which is connected to one of said component followers for driving thereof; a first two-wire transmission line for transmitting said A.C. intelligence signal from one generator at said transmitter to said receiver including first impedances across said two wires, one at the transmitter and the other at the receiver, a second two-transmission line for transmitting said A.C. intelligence signal from the second generator at said transmitter to said receiver including second impedances across said two wires, one at the transmitter and one at the receiver; individual means at said receiver for rectifying said component intelligence signals as received from said transmission lines; individual means at said receiver for continuously comparing each of said rectified component intelligence signals as received from said first and second transmission lines with the corresponding rectified component follower signals and providing a pair of difference signals; first means utilizing one of said difference signals for energizing one of said motor means to drive one of said component followers in correspondence with the respective director component member; second means utilizing the other of said difference signals for energizing the other of said motor means to drive the other of said component followers in correspondence with the respective other director component member; and A.C. reference signal means at said transmitter providing a constant amplitude signal of said fixed frequency for exciting said director component member generators directly, thereby determining an intelligence signal reference amplitude at said transmitter; said A.C. reference signal means being connected to the midpoints of the first and second impedances at said transmitter for transmitting said reference signal from said reference signal means to said receiver; and means connected to the midpoints of the first and second impedances at said receiver for exciting said follower component generators with such reference signal after such transmission to said receiver, thereby determining an intelligence signal conditioned reference amplitude for said follower component generated signals.

7. A follow-up system comprising a transmitter including a directing element whose position is resolved by two component members into two component positions and for each of which component positions a separate intelligence signal is transmitted to a receiver, a pair of A.C. generators one each of which is connected to a respective one of said component members for generating a pair of A.C. intelligence signals of the same fixed frequency whose amplitudes correspond respectively to the component positions of said directing element and individual means for rectifying said component intelligence signals; a receiver including a following element for following said directing element and whose position is the resultant of the positions of two component followers whose positions correspond respectively to the component member positions of said directing element, a pair of A.C. generators one each of which is connected to one each of component followers for generating a pair of A.C. follower signals of said fixed frequency whose amplitudes correspond respectively to the component positions of said following element, individual means for rectifying said component follower signals, and a pair of motor means one each of which is connected to one of said component followers for driving thereof; a first two-wire transmission line for transmitting said rectified intelligence signal from one generator at said transmitter to said receiver including first impedances across said two wires, one at the transmitter and the other at the receiver; a second two-wire transmission line for transmitting said rectified intelligence signal from the second generator at said transmitter to said receiver including second impedances across said two wires, one at the transmitter and one at the receiver, individual means at said receiver for continuously comparing each of said rectified component intelligence signals as received from said first and second transmission lines with the corresponding rectified component follower signals and providing a pair of difference signals; first means utilizing one of said difference signals for energizing one of said motor means to drive one of said component followers in correspondence with the respective directing element component member; second means utilizing the other of said difference signals for energizing the other of said motor means to drive the other of said component followers in correspondence with the respective other directing element component member; and A.C. reference signal means at said transmitter providing a constant amplitude signal of said fixed frequency for exciting said directing element component member generators directly, thereby determining an intelligence signal reference amplitude at said transmitter; said A.C. reference signal means being connected to the mid-points of the first and second impedances at said transmitter for transmitting said reference signal from said reference signal means to said receiver; and means connected to the mid-points of the first and second impedances at said receiver for exciting said follower component generators with such reference signal after such transmission to said receiver, thereby determining an intelligence signal conditioned reference amplitude for said follower component generated signals.

8. A follow-up system comprising a transmitter including a directing element whose position is resolved by two component members into two component positions and for each of which component position a separate intelligence signal is transmitted to a receiver, a first rotary transformer including an exciting winding, a fixed winding and a winding on a rotor mechanically connected to one of said component members to be driven thereby, said fixed winding and said rotor winding being connected in series for generating a first A.C. intelligence signal of fixed frequency whose amplitude corresponds to the position of said one component member, a second rotary transformer including an exciting winding, a fixed winding, and a winding on a rotor mechanically connected to the other one of said component members to be driven thereby, said fixed winding and said rotor winding being connected in series for generating a second A.C. intelligence signal of the said fixed frequency whose amplitude corresponds to the position of said other component member, and A.C. reference signal means providing a constant amplitude signal of said fixed frequency and electrically connected to the exciting windings of said first and second rotary transformers for excitation thereof, thereby determining an intelligence signal reference amplitude for said first and second intelligence signals at said transmitter; a receiver including a following element for following said directing element and whose position is the resultant of the positions of two component followers whose positions correspond respectively to the component member positions of said directing element, a third rotary transformer including an exciting winding, a fixed winding, and a winding on a rotor mechanically connected to one of said component followers to be driven thereby, said fixed winding and said rotor winding being connected in series for generating a first A.C. follower signal of said fixed frequency whose amplitude corresponds to the position of said one of said component followers, a fourth rotary transformer including an exciting winding, a fixed winding, and a winding on a rotor mechanically connected to the other one of said component followers to be driven thereby, said fixed winding and said rotor winding being connected in series for generating a second A.C. follower signal of said fixed frequency whose amplitude corresponds to the position of said other one of said component followers, individual means for rectifying said component follower signals, first motor means mechanically connected to said one component follower for driving thereof and second motor means mechanically connected to said other component follower for driving thereof; a first transmission line for transmitting said first A.C. intelligence signal to said receiver; a second transmission line for transmitting said second A.C. intelligence signal to said receiver; individual means at said receiver for rectifying said first and second intelligence signals as received from said transmission lines; individual means at said receiver for continuously comparing said first and second rectified intelligence signals as received from said first and second transmission lines with said first and second rectified follower signals respectively and providing first and second difference signals; first means utilizing said first difference signal for energizing said first motor means to drive said one of said component followers in correspondence with said one component member; second means utilizing said second difference signal for energizing said second motor means to drive said other one of said component followers in correspondence with said other component member; a third transmission line subject to transmitting conditions similar to said first and second transmission lines for transmitting said A.C. reference signal from said reference signal means to said receiver; and means electrically connecting said reference signal after such transmission to the exciting windings of said third and fourth rotary transformers for excitation thereof, thereby determining an intelligence signal conditioned reference amplitude for said first and second follower signals.

9. A follow-up system comprising a transmitter including a directing element whose position is resolved by two component members into two component positions and for each of which component position a separate intelligence signal is transmitted to a receiver, a first rotary transformer including an exciting winding, a fixed winding and a winding on a rotor mechanically connected to one of said component members to be driven thereby, said fixed winding and said rotor winding being connected in series for generating a first A.C. intelligence signal of fixed frequency whose amplitude corresponds to the position of said one component member, a second rotary transformer including an exciting winding, a fixed winding, and a winding on a rotor mechanically connected to the other one of said component members to be driven thereby, said fixed winding and said rotor winding being connected in series for generating a second A.C. intelligence signal of the said fixed frequency whose amplitude corresponds to the position of said other component member, A.C. reference signal means providing a constant amplitude signal of said fixed frequency and electrically connected to the exciting windings of said first and second rotary transformers for excitation thereof, thereby determining an intelligence signal reference amplitude for said first and second intelligence signals at said transmitter and individual means for rectifying said component intelligence signals; a receiver including a following element for following said directing element and whose position is the resultant of the positions of two component followers whose positions correspond respectively to the component member positions of said directing element, a third rotary transformer including an exciting winding, a fixed winding, and a winding on a rotor mechanically connected to one of said component followers to be driven thereby, said fixed winding being connected in series for generating a first A.C. follower signal of said fixed frequency whose amplitude corresponds to the position of said one of said component followers, a fourth rotary transformer including an exciting winding, a fixed winding, and a winding on a rotor mechanically connected to the other one of said component followers to be driven thereby, said fixed winding and said rotor winding being connected in series for generating a second A.C. follower signal of said fixed frequency whose amplitude corresponds to the position of said other one of said component followers, individual means for rectifying said component follower signals, first motor means mechanically connected to said one component follower for driving thereof and second motor means mechanically connected to said other component follower for driving thereof; a first transmission line for transmitting said rectified intelligence signal to said receiver; a second transmission line for transmitting said second rectified intelligence signal to said receiver; individual means at said receiver for continuously comparing said first and second rectified intelligence signals as received from said first and second transmission lines with the said first and second rectified follower signals respectively and providing first and second difference signals; first means utilizing said first difference signal for energizing said first motor means to drive said one of said component followers in correspondence with said one component member; second means utilizing said second difference signal for energizing said second motor means to drive said other one of said component followers in correspondence with said other component member; a third transmission line subject to transmitting conditions similar to said first and second transmission lines for transmitting said A.C. reference signal from said reference signal means to said receiver; and means electrically connecting said reference signal after such transmission to the exciting windings of said third and fourth rotary transformers for excitation thereof, thereby determining an intelligence signal conditioned reference amplitude for said first and second follower signals.

10. A follow-up system comprising a transmitter including a directing element whose position is resolved by two component members into two component positions and for each of which component positions a separate intelligence signal is transmitted to a receiver, a first rotary transformer including an exciting winding, a fixed winding and a winding on a rotor mechanically connected to one of said component members to be driven thereby, said fixed winding and said rotor winding being connected in series for generating a first A.C. intelligence signal of fixed frequency whose amplitude corresponds to the position of said one component member, a second rotary transformer including an exciting winding, a fixed winding, and a winding on a rotor mechanically connected to the other one of said component members to be driven thereby, said fixed winding and said rotor winding being connected in series for generating a second A.C. intelligence signal of the said fixed frequency whose ampiltude corresponds to the position of said other component member, and A.C. reference signal means providing a constant amplitude signal of said fixed frequency and electrically connected to the exciting windings of said first and second rotary transformers for excitation thereof, thereby determining an intelligence signal reference amplitude for said first and second intelligence signals at said transmitter, a receiver including a following element for following said directing element and whose position is the resultant of the positions of two component followers whose positions correspond respectively to the component member positions of said directing element, a third rotary transformer including an exciting winding, a fixed winding, and a winding on a rotor mechanically connected to one of said component followers to be driven thereby, said fixed winding and said rotor winding being connected in series for generating a first A.C. follower signal of said fixed frequency whose amplitude corresponds to the position of said one of said component followers, a fourth rotary transformer including an exciting winding, a fixed winding, and a winding on a rotor mechanically conected to the other one of said component followers to be driven thereby, said fixed winding and said rotor winding being connected in series for generating a second A.C. follower signal of said fixed frequency whose amplitude corresponds to the position of said other one of said component followers individual means for rectifying said component follower signals, first motor means mechanically connected to said one component follower for driving thereof and second motor means mechanically connected to said other component follower for driving thereof; a first two-wire transmission line for transmitting said first A.C. intelligence signal to said receiver including first impedances across said two wires, one at the transmitter and one at the receiver; a second two-wire transmission line for transmitting said secondary A.C. intelligence signal to said receiver including second impedances across said two wires, one at the transmitter and one at the receiver, individual means at said receiver for rectifying said first and second intelligence signals as received from said transmission lines; individual means at said receiver for continuously comparing said first and second rectified intelligence signals as received from said first and second transmission lines with the said first and second rectified follower signals respectively and providing first and second difference signals; first means utilizing said first difference signals for energizing said first motor means to drive said one of said component followers in correspondence with said one component member; second means utilizing said second difference signal for energizing said second motor means to drive said other one of said component followers in correspondence with said other component members; said A.C. reference signal means being connected to the mid-points of the first and second impedances at said transmitter for transmitting said A.C. reference signal from said reference signal means to said receiver; and means connected to the mid-points of the first and second impedances at said receiver for electrically connecting said reference signal after such transmission to said receiver to the exciting windings of said third and fourth rotary transformers for excitation thereof, thereby determining an intelligence signal conditioned reference amplitude for said first and second follower signals.

11. A follow-up system comprising a transmitter including a directing element whose position is resolved by two component members into two component positions and for each of which component positions a separate intelligence signal is transmitted to a receiver, a first rotary transformer including an exciting winding, a fixed winding and a winding on a rotor mechanically connected to one of said component members to be driven thereby, said fixed winding and said rotor winding, a fixed winding and a winding on a rotor me-A.C. intelligence signal of fixed frequency whose amplitude corresponds to the position of said one component member, a second rotary transformer including an exciting winding, a fixed winding, and a winding on a rotor mechanically connected to the other one of said component members to be driven thereby, said fixed winding and said rotor winding being connected in series for generating a second A.C. intelligence signal of the said fixed frequency whose amplitude corresponds to the position of said other component member, and A.C. reference signal means providing a constant amplitude signal of said fixed frequency and electrically connected to the exciting windings of said first and second rotary transformers for excitation thereof, thereby determining an intelligence signal reference amplitude for said first and second intelligence signals at said transmitter and individual means for rectifying said component intelligence signals; a receiver including a following element for following said directing element and whose position is the resultant of the positions of two component followers whose positions correspond respectively to the component member positions of said directing element, a third rotary transformer including an exciting winding, a fixed winding, and a winding on a rotor mechanically connected to one of said component followers to be driven thereby, said fixed winding and said rotor winding being connected in series for generating a first A.C. follower signal of said fixed frequency whose amplitude corresponds to the position of said one of said component followers, a fourth rotary transformer including an exciting winding, a fixed winding, and a winding on a rotor mechanically connected to the other one of said component followers to be driven thereby, said fixed winding and said rotor winding being connected in series for generating a second A.C. follower signal of said fixed frequency whose amplitude corresponds to the position of said other one of said component followers, individual means for rectifying said component follower signals, first motor means mechanically connected to said one component follower for driving thereof and second motor means mechanically connected to said other component follower for driving thereof; a first transmission line for transmitting said rectified intelligence signal to said receiver; a second transmission line for transmitting said second rectified intelligence signal to said receiver; individual means at said receiver for continuously comparing said first and second rectified intelligence signals as received from said first and second transmission lines with the said first and second rectified follower signals respectively and providing first and second difference signals; first means utilizing said first difference signals for energizing said first motor means to drive said one of said component followers in correspondence with said one component member; second means utilizing said second difference signal for energizing said second motor means to drive said other one of said component followers in correspondence with said other component member, said A.C. reference signal means being connected to the mid-points of the first and second impedances at said transmitter for transmitting said A.C. reference signal from said reference signal means to said receiver; and means connected to the mid-points of the first and second impedances at said receiver for electrically connecting said reference signal after such transmission to said receiver to the exciting windings of said third and fourth rotary transformers for excitation thereof, thereby determining an intelligence signal conditioned reference amplitude for said first and second follower signals.

12. A written intelligence follow-up system comprising a transmitter including a writing element whose position is resolved by two component members into two component positions and for each of which component positions a separate intelligence signal is transmitted to a receiver, a first rotary transformer including an exciting winding, a fixed winding and a winding on a rotor mechanically connected to one of said component members to be driven thereby, said fixed winding and said rotor winding being connected in series for generating a first A.C. intelligence signal of fixed frequency whose amplitude corresponds to the position of said one component member, a second rotary transformer including an exciting winding, a fixed winding, and a winding on a rotor mechanically connected to the other one of said component members to be driven thereby, said fixed winding and said rotor winding being connected in series for generating a second A.C. intelligence signal of the said fixed frequency whose amplitude corresponds to the position of said other component member, and A.C. reference signal means providing a constant amplitude signal of said fixed frequency and electrically connected to the exciting windings of said first and second rotary transformers for excitation thereof, thereby determining an intelligence signal reference amplitude for said first and second intelligence signals at said transmitter; a receiver including a transcribing element for following said writing element and whose position is the resultant of the positions of two component followers whose positions correspond respectively to the component member positions of said directing element, a third rotary transformer including an exciting winding, a fixed winding, and a winding on a rotor mechanically connected to one of said component followers to be driven thereby, said fixed winding and said rotor winding being connected in series for generating a first A.C. follower signal of said fixed frequency whose amplitude corresponds to the position of said one of said component followers, a fourth rotary transformer including an exciting winding, a fixed winding, and a winding on a rotor mechanically connected to the other one of said component followers to be driven thereby, said fixed winding and said rotor winding being connected in series for generating a second A.C. follower signal of said fixed frequency whose amplitude corresponds to the position of said other one of said component followers, individual means for rectifying said component follower signals, first motor means mechanically connected to said one component follower for driving thereof and second motor means mechanically connected to said other component follower for driving thereof; a first transmission line for transmitting said first A.C. intelligence signal to said receiver; a second transmission line for transmitting said second A.C. intelligence signal to said receiver; individual means at said receiver for rectifying said first and second intelligence signals as received from said transmission lines; individual means at said receiver for continuously comparing said first and second rectified intelligence signals as received from said first and second transmission lines with said first and second rectified follower signals respectively and providing first and second difference signals; first means utilizing said first difference signal for energizing said first motor means to drive said one of said component followers in correspondence with said one component member; second means utilizing said second difference signal for energizing said second motor means to drive said other one of said component followers in correspondence with said other component members; a third transmission line subject to transmitting conditions similar to said first and second transmission lines for transmitting said A.C. reference signal from said reference signal means to said receiver; and means electrically connecting said reference signal after such transmission to said receiver to the exciting windings of said third and fourth rotary transformers for excitation thereof, thereby determining an intelligence signal conditioned reference amplitude for said first and second transcriber follower signals; means at said transmitter for generating a D.C. signal upon application of said writing element to a writing surface, said D.C. signal being transmitted to said receiver over said third transmission line; and means at said receiver utilizing said D.C. signal for applying said transcribing element to a transcribing surface.

References Cited in the file of this patent

UNITED STATES PATENTS

| | | |
|---|---|---|
| 2,611,812 | Hornfeck | Sept. 23, 1952 |
| 2,649,503 | Adler | Aug. 18, 1953 |
| 2,708,730 | Alexander | May 17, 1955 |

UNITED STATES PATENT OFFICE

CERTIFICATION OF CORRECTION

Patent No. 2,965,715 December 20, 1960

Robert Adler

It is hereby certified that error appears in the above numbered patent requiring correction and that the said Letters Patent should read as corrected below.

Column 6, line 17, for "signal" read -- single --; line 40, for "th" read -- the --; column 13, line 7, for "amplitude" read -- amplitudes --; line 19, for "are" read -- as --; column 16, line 50, after "winding" insert -- and said rotor winding --; column 17, lines 60 and 61, after "followers" insert a comma; column 18, line 33, for "winding, a fixed winding and a winding on a rotor me-" read -- winding being connected in series for generating a first --.

Signed and sealed this 30th day of May 1961.

(SEAL)
Attest:

ERNEST W. SWIDER
Attesting Officer

DAVID L. LADD
Commissioner of Patents